April 26, 1927.
S. PARDA
1,626,150
CHANGEABLE PICTURE FRAME
Filed June 28, 1926
2 Sheets-Sheet 1
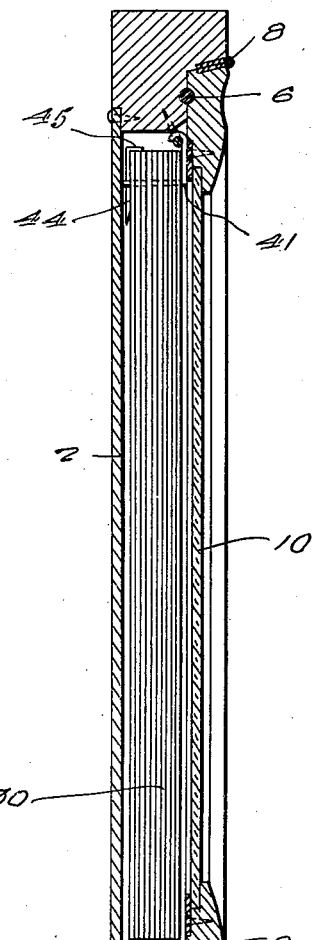
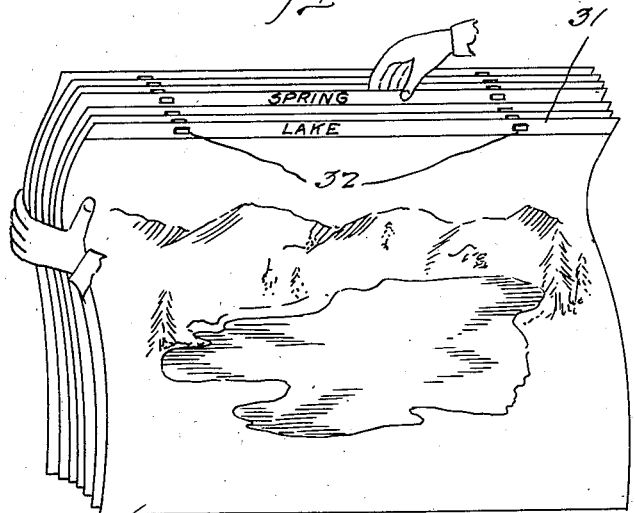
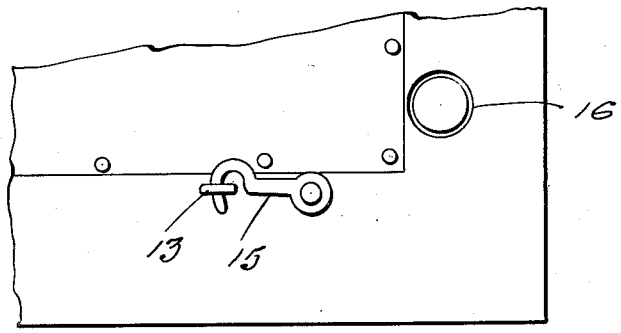
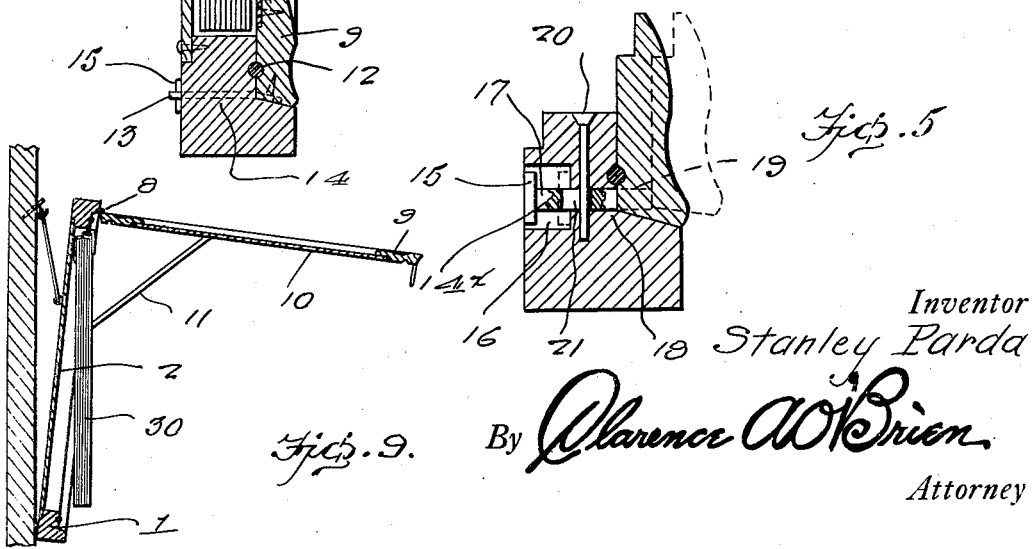
Inventor
Stanley Parda
By Clarence A. O'Brien
Attorney April 26, 1927.
S. PARDA
1,626,150
CHANGEABLE PICTURE FRAME
Filed June 28, 1926    2 Sheets-Sheet 2
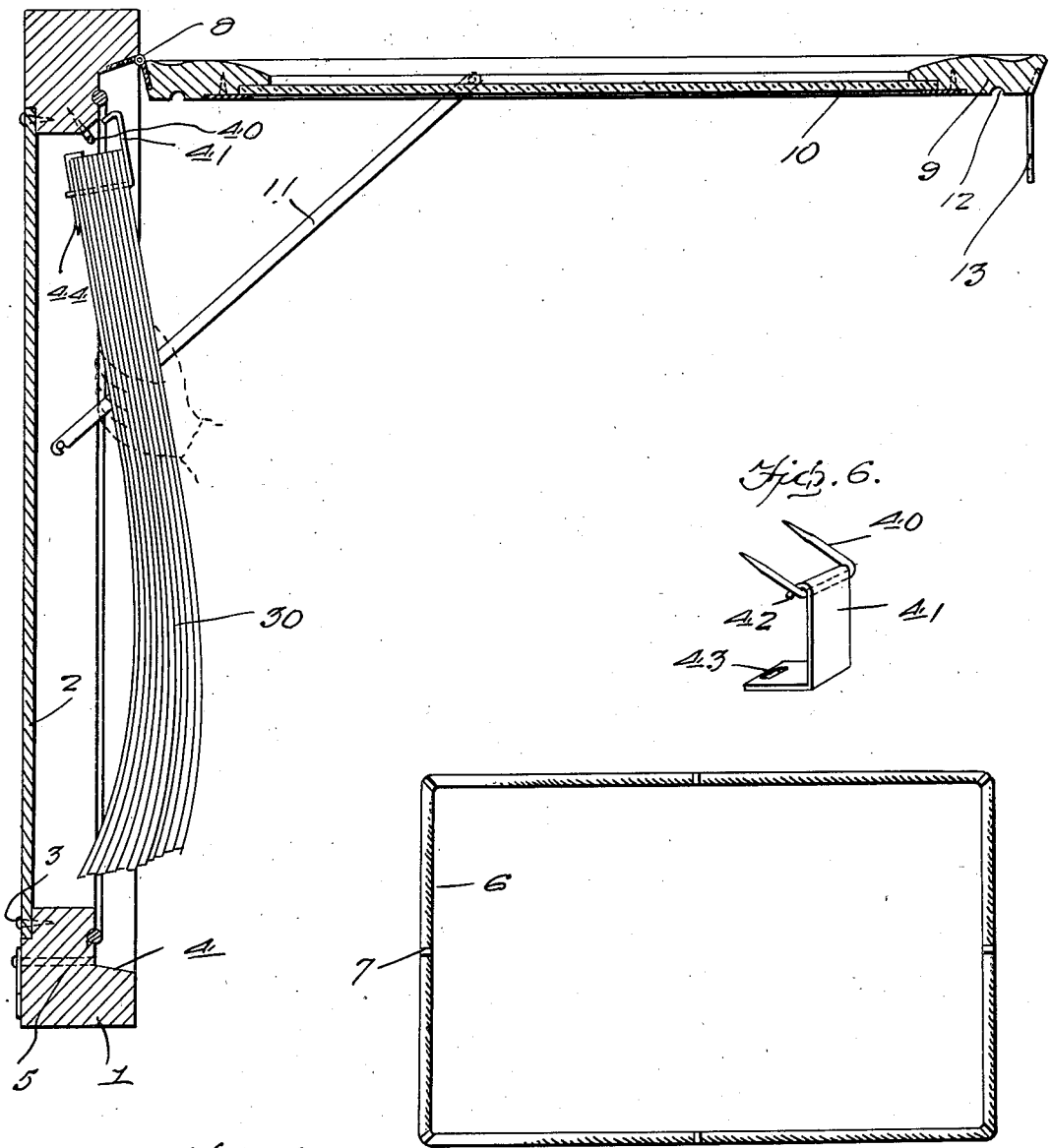
Fig. 2.
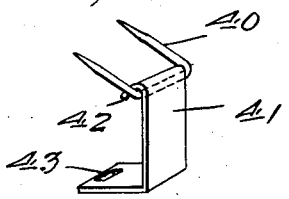
Fig. 6.
Fig. 7.
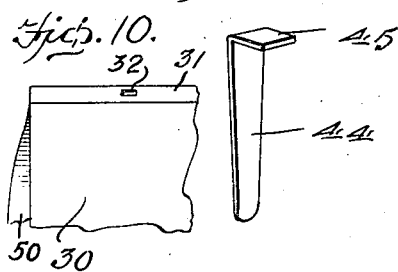
Fig. 10.  Fig. 8.
Inventor
Stanley Parda
By *Clarence A. O'Brien*
Attorney Patented Apr. 26, 1927.

1,626,150

UNITED STATES PATENT OFFICE.

STANLEY PARDA, OF MIDDLETOWN, CONNECTICUT.

CHANGEABLE PICTURE FRAME

Application filed June 28, 1926. Serial No. 119,128.

My present invention has to do with changeable picture frames, and contemplates the provision of a picture frame adapted to hold a considerable aggregation of pictures, and this in such manner that any one of the pictures may be made foremost for display purposes with great facility.

Another object of the invention is the provision of a picture frame which by virtue of its construction is practically dust-proof.

The invention further contemplates the provision of a changeable picture frame embodying means whereby the front glass carrying frame may be quickly and easily opened when occasion demands.

The invention further contemplates the provision of a changeable picture frame which is possessed of the capacity of containing in orderly fashion a number of pictures, and yet present the appearance of an ordinary picture frame of finished and ornamental character.

Other objects and practical advantages of the invention will be fully understood from the following description and claims when the same are read in connection with the drawings, accompanying and forming part of this specification, in which:—

Figure 1 is a vertical section showing in closed state the changeable picture frame constituting the best practical embodiment of my invention of which I am cognizant.

Figure 2 is a vertical section showing the picture frame as open and also making clear the facility with which the plurality of pictures considered as a unit may be secured in and removed from the frame.

Figure 3 is a perspective showing the manner in which the plurality of pictures is held when the connecting means thereof is removed and so that any picture may be readily selected to be arranged foremost and displayed.

Figure 4 is an enlarged detail rear elevation illustrative of the means for moving the forward glass-carrying frame forwardly.

Figure 5 is a fragmentary vertical section illustrating the said means for moving the forward glass-carrying frame forwardly.

Figure 6 is a detail perspective illustrating one of the improved devices for connecting the several pictures together.

Figure 7 is a detail elevation showing the packing means and the securing devices complementary thereto.

Figure 8 is a detail perspective view of one of the pins comprised in the picture connecting devices.

Figure 9 is a view on a reduced scale showing clearly the manner in which the package of pictures may be taken from the frame while the frame is suspended from a wall.

Figure 10 is a detail perspective showing one picture and the blotting paper permanently attached to the picture at the back of the picture, the blotting paper being pasted to the upper end of the picture and being designed to protect the subject of the next adjoining picture.

Similar numerals of reference designate corresponding parts in all of the views of the drawings.

The main frame 1 of my improved changeable picture frame is equipped with a back 2 of cardboard or other appropriate material, appropriately attached at 3. The forward side of the frame 1 is rabbeted as designated by 4 and in the inner wall of the rabbet is provided a channel 5 to seat a portion of a rectangular packing cord 6, the said cord 6 being secured to the frame 1 through the medium of staples 7 which straddle and have their bights embedded in the cord and are driven into the frame 1 so as to strongly retain the cord 6 in the seat 5.

Hingedly connected at 8 to the frame 1 is the front, glass-carrying frame 9 of the improved device. The glass of said frame 9 is designated by 10, and the frame 9 is equipped with a bar 11 by which it may be detachably secured in open position after the manner illustrated in Figure 2. It will also be noticed by comparison of Figures 1 and 2 that the frame 9 is provided at its inner side with a rectangular channel 12 adapted when the frame 9 is closed to receive a portion of the cord 6, this with a view of effectively excluding dust and dirt from the changeable picture frame when the front frame 9 is secured in closed position. At points adjacent to its end the front frame 9 is provided with tongues 13 designed to be sheathed at 14 in the main frame 1 and apertured for the engagement of hooks 15, after the manner best shown in Figures 1 and 4 for the strong detachable securing of the frame 9 in closed position.

In order to render easy the opening of the frame 9 after the hooks 15 are disengaged from the tongues 13, I provide the means shown in Figure 5, and at this point I would have it understood that in practice the said means is duplicated adjacent to each end of the changeable picture frame. The means referred to comprises a push pin 14ˣ, the head 15 of which is disposed and movable in a countersink 16 in the rear side of the frame 1. The shank 17 of the said pin extends forwardly through a bore 18 in the frame 1 and is designed to normally rest in a socket 19 in the rear side of the frame 9. The said push pin is secured in the frame 1 through the medium of a pin 20 disposed in a slot 21 in the push pin, and hence it will be understood that there is no liability of the push pin 14ˣ being casually displaced while the changeable picture frame is in use. The said push pin 14ˣ, however, is adapted to be pushed forwardly from the back of the main frame 1, and when so pushed is adapted to displace the glass-carrying frame 9 from the rabbet in the main frame 1 so that the said glass-carrying frame 9 may be expeditiously and easily swung to and detachably secured in the position in Figure 2. In this connection it will be appreciated that on the closing of the frame 9, the push pins 14ˣ will offer no obstruction whatever to the snug seating of the frame 9 in the rabbet of the main frame 1.

The several pictures to be carried and displayed in my novel changeable picture frame are designated by 30, and each is provided on its upper ege with a name bearing strip 31 and each is also provided with a pair of apertures 32. As will be understood from Figure 3 the user of the picture frame is enabled to hold the packet of pictures in one hand and with his other hand remove the desired picture to be placed foremost for display purposes.

The upper bar of the main frame 1 is provided with two staples 40, Figures 1, 2 and 6. These staples 40 are for the connecting and suspending devices complementary to the packet of pictures 30. Each of the said connecting and suspending devices comprises a right angle member 41 having a hook 42 at the upper end of one arm and an aperture 43 adjacent to the inner end of its other arm. Each connecting and suspending device also comprises a pin 44, Figures 1, 2 and 8, the said pin 44, being adapted to be removably sheathed in the aperture 43 and being provided with a right angle head 45 designed to bear on the upper edges of certain of the pictures with the result that the pin 44 is adequately secured in position and hence is enabled to securely retain the right angle member 41 in the packet of pictures 30.

It will be gathered from Figure 1 that when the picture frame is closed, all of the pictures 30 will be suspended in the frame, and this in such manner that the foremost picture will be displayed to advantage, and also in such manner that dust and dirt will be especially excluded from the interior of the frame and therefore from the pictures. When it is desired to place a new set of pictures in the frame 1 or it is desired to place another picture in foremost position for the display thereof, it is simply necessary for the user to disengage the hooks 15 from the tongues 13 and then push forwardly on the push pins 14ˣ whereupon the frame 9 will be displaced from the rabbets in the main frame 1 so that said frame 9 may be conveniently grasped and moved to the position shown in Figure 2 in which position the frame 9 may be supported through the medium of the bar 11 relatively arranged as shown. Manifestly with the frame 9 positioned as in Figure 2, the packet of pictures 30 connected in the manner shown and described may be readily disconnected from the staples 40 and removed from the frame 1 and may as readily be re-engaged with the staples 40 and replaced in the frame 1. Again it will be understood that when the packet of pictures is removed from the frame 1 the right angle members 41 and the pins 44 may be removed whereupon any one of the pictures may be expeditiously and easily selected and shifted to the foremost position, after which the right angle members 41 may be replaced and secured in the pictures, and the packet may then be replaced in the frame 1 and the members 41 replaced in engagement with the staples 40, with the result that the packet of pictures will be neatly suspended in the frame 1 after the manner shown in Figure 1 and so that when the frame 9 is closed and secured in closed position, the foremost picture will be displayed to advantage through the glass 10, and all of the pictures will be preserved in a smooth state so that any one of the pictures may be arranged foremost and dis played when occasion demands.

It will be apparent from Figure 3 that the names of the pictures on the strips 31 will render easy the selection of any particular picture that it is desired to shift and arrange foremost for the display thereof.

It will also be apparent that my novel changeable picture frame is susceptible of being easily and inexpensively fabricated, and that the said picture frame may be made to simulate an ordinary picture frame of neat and finished appearance.

Manifestly the pictures to be displayed in my improvement may be the portraits of famous people, such as poets, great preachers, authors, great artists, Bible heroes, great musicians, statesmen, and missionary heroes, as well as pictures of scenery, and it will also be manifest that it is feasible to display the pictures of statesmen on their respective birthdays and that pictures of scenery and the like may be compatible with the particular season at hand. Obviously, however, any picture may be displayed at any time at the pleasure of the owner of the improved picture frame.

As is made clear by Figure 9 the packet of pictures may be disassociated from the frame without removing the frame from the wall or other support on which the frame is suspended.

The blotting paper shown in Figure 10 and designated by 50 is carried by each picture, and it has for its function to protect the face of the next adjoining picture against which it rests. The upper edge portion of the blotting paper 50 is pasted or otherwise appropriately attached to the upper edge portion of the picture.

I have entered into a detailed description of the construction and relative arrangement of the parts embraced in the present and preferred embodiment of my invention in order to impart a full, clear and exact understanding of the said embodiment. I do not desire, however, to be understood as limiting myself to the precise construction and relative arrangement of parts as disclosed, my invention being defined by my appended claims within the scope of which modifications may be made without departure from my invention.

Having described my invention, what I claim and desire to secure by Letters-Patent, is:—

1. In combination, a main frame closed at its back and equipped on the inner side of its top bar with spaced staples, a glass-carrying frame movably connected with the main frame, a packet of pictures, each picture of the packet having a pair of apertures, and picture connecting and suspending devices, each of said devices being made up of a right angle member with a hook at the upper end of one arm and an aperture adjacent to the inner end of the other arm, and a pin adapted to be removably arranged in said aperture of the right angle member and having an angularly disposed head adapted to bear on the upper edges of certain of the pictures, and the said hooks of the right angle members being adapted to be engaged with and disengaged from the said staples.

2. In combination, a main frame closed at its back and equipped on the inner side of its top bar with spaced staples, a glass-carrying frame movably connected with the main frame, a packet of pictures, each picture of the packet having a pair of apertures, and picture connecting and suspending devices, each of said devices being made up of a right angle member with a hook at the upper end of one arm and an aperture adjacent to the inner end of the other arm, and a pin adapted to be removably arranged in said aperture of the right angle member and having an angularly disposed head adapted to bear on the upper edges of certain of the pictures, and the said hooks of the right angle members being adapted to be engaged with and disengaged from the said staples; the said pictures being provided on their upper edges with name bearing strips in which are apertures coincident with the apertures in the pictures.

3. A picture frame comprising a main frame having a rabbet in its forward side and also having a countersink in its rear side and a bore extending from said countersink to the said rabbet, an endwise movable push pin having a head disposed in said countersink and also having a shank disposed and movable in said bore, means for detachably securing a glass-carrying frame in the rabbet of the main frame, the said glass-carrying frame hingedly connected to the main frame and adapted when closed in the rabbet of the main frame to be in position to rest detachably against the forward end of said push pin, and means retaining the push pin in the main frame.

4. A picture frame comprising a main frame having a rabbet in its forward side and also having a countersink in its rear side and a bore extending from said countersink to the said rabbet, an endwise movable push pin having a head disposed in said countersink and also having a shank disposed and movable in said bore, means for detachably securing a glass-carrying frame in the rabbet of the main frame, the said glass-carrying frame hingedly connected to the main frame and adapted when closed in the rabbet of the main frame to be in position to rest detachably against the forward end of said push pin, and means retaining the push pin in the main frame; the shank of the push pin being longitudinally slotted, and the said means for retaining the push pin in the main frame being formed by a pin seated in the main frame and disposed in the slot of the push pin.

5. In a changeable picture frame and in combination, a main frame, staples carried by and pendant from the upper bar of said frame at the inner side of said bar, a glass-carrying frame movably connected with the main frame, a packet of separable pictures, each picture having apertures, and devices extending through and secured in the apertures of the pictures for the detachable connection of the same in a group or unit; the said devices equipped at their forward ends with hooks detachably engaged with the said pendent staples for the suspension of the packet of pictures in the main frame.

In testimony whereof I affix my signature.

STANLEY PARDA.